(12) United States Patent
Xu

(10) Patent No.: US 9,182,156 B2
(45) Date of Patent: Nov. 10, 2015

(54) CRYOGENIC REFRIGERATOR, CRYOPUMP AND DISPLACER

(71) Applicant: Mingyao Xu, Tokyo (JP)

(72) Inventor: Mingyao Xu, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 382 days.

(21) Appl. No.: 13/632,252

(22) Filed: Oct. 1, 2012

(65) Prior Publication Data

US 2013/0086926 A1    Apr. 11, 2013

(30) Foreign Application Priority Data

Oct. 5, 2011   (JP) .................. 2011-221265

(51) Int. Cl.

| F25B 9/00 | (2006.01) |
|---|---|
| B01D 8/00 | (2006.01) |
| F25B 9/14 | (2006.01) |
| F25B 9/10 | (2006.01) |
| F04B 37/08 | (2006.01) |

(52) U.S. Cl.
CPC ... *F25B 9/14* (2013.01); *B01D 8/00* (2013.01); *F04B 37/08* (2013.01); *F25B 9/10* (2013.01); *F25B 2309/003* (2013.01)

(58) Field of Classification Search
CPC .............. F25B 9/10; F25B 9/12; F25B 9/14; F25B 9/145; F25B 2309/003; F25B 2309/1408; F25B 2309/1418; F25B 2309/001; B01D 8/00; F04B 37/08
USPC ...................................................... 62/55.5, 6
See application file for complete search history.

(56) References Cited

U.S. PATENT DOCUMENTS

| 5,590,533 A * | 1/1997 | Asami et al. .................. 62/6 |
|---|---|---|
| 8,302,409 B2 | 11/2012 | Fukuda |
| 2008/0173026 A1 | 7/2008 | Mita et al. |
| 2009/0165469 A1* | 7/2009 | Matsubara ............... 62/55.5 |
| 2010/0115971 A1* | 5/2010 | Tsuyuki .................. 62/55.5 |

FOREIGN PATENT DOCUMENTS

| JP | 04-124561 | 4/1992 |
|---|---|---|
| JP | 07-004765 | 1/1995 |
| JP | H11-173697 | 7/1999 |
| JP | 2000-002470 | 1/2000 |
| JP | 2001-241796 | 9/2001 |
| JP | 2003-75005 | * 3/2003 |
| JP | 2004-144461 | 5/2004 |
| JP | 3588644 | 11/2004 |
| JP | 2007-298008 | 11/2007 |
| JP | 2008-057924 | 3/2008 |
| KR | 2010-0020038 | 2/2010 |

OTHER PUBLICATIONS

Masakazu, Okamoto. Seal Mechansm, and Freezer and Turbo Compressor Equipped Therewith—English Translation. Daikin Ind Ltd, assignee. Patent JP 2000-002470. N.d. Print.*

* cited by examiner

*Primary Examiner* — Frantz Jules
*Assistant Examiner* — Keith Raymond
(74) *Attorney, Agent, or Firm* — IPUSA, PLLC

(57) ABSTRACT

A two-stage GM cryogenic refrigerator includes a displacer having a low-temperature side and a high-temperature side and a motor configured to drive the displacer. The motor is configured to be rotatable forward in cooling and backward in increasing a temperature. The cryogenic refrigerator further includes a resin provided on an outer circumferential surface of the displacer. A thickness of the resin is thinner on the high-temperature side than on the low-temperature side.

9 Claims, 6 Drawing Sheets

US 9,182,156 B2

CRYOGENIC REFRIGERATOR, CRYOPUMP AND DISPLACER

CROSS-REFERENCE TO RELATED APPLICATIONS

This patent application is based upon and claims the benefit of priority of Japanese Patent Application No. 2011-221265, filed on Oct. 5, 2011, the entire contents of which are incorporated herein by reference.

BACKGROUND OF THE INVENTION

1. Field of the Invention

The present invention relates to a cryogenic refrigerator, a cryopump and a displacer that include a resin provided on a surface of the displacer.

2. Description of the Related Art

Conventionally, a cryogenic refrigerator is known that uses a refrigerant gas such as a helium gas, drives a displacer in a cylinder, and generates cooling by expanding the refrigerant gas in the cylinder. For example, a Gifford-McMahon (which may be called "GM") refrigerator is used as a cryogenic refrigerator.

This GM cryogenic refrigerator once implemented can generate cooling of about 10 K by being made multistage. Accordingly, the GM cryogenic refrigerator is often used for a cryopump and the like that evacuate a vacuum chamber of a semiconductor fabrication apparatus and the like to make a vacuum.

Furthermore, one of the GM cryogenic refrigerators is configured to include a displacer, an outer circumferential surface of which is coated with a resin to improve a sealing characteristic as disclosed in Japanese Patent No. 3588644. Conventionally, a thickness of the resin is formed uniformly on the whole outer circumferential surface.

SUMMARY OF THE INVENTION

According to an aspect of the present invention, there is provided a tow-stage GM cryogenic refrigerator includes a displacer having a low-temperature side and a high-temperature side and a motor configured to drive the displacer. The motor is configured to be rotatable forward in decreasing a temperature and backward in increasing a temperature. The cryogenic refrigerator further includes a resin provided on an outer circumferential surface of the displacer. A thickness of the resin is thinner on the high-temperature side than on the low-temperature side.

According to another aspect of the present invention, there is provided a cryopump including a vacuum chamber configured to allow a purge gas to be supplied thereinto and to be evacuated therefrom, a cryopanel provided in the vacuum chamber, and a cryogenic refrigerator configured to cool the cryopanel. The cryogenic refrigerator includes a displacer having a low-temperature side and a high-temperature side and a motor configured to drive the displacer. The motor is configured to be rotatable forward in decreasing a temperature and backward in increasing a temperature. The cryogenic refrigerator further includes a resin provided on an outer circumferential surface of the displacer. A thickness of the resin is thinner on the high-temperature side than on the low-temperature side.

According to another aspect of the present invention, there is provided a displacer provided in a cylinder of a cryogenic refrigerator. The displacer includes a resin provided on an outer circumferential surface of the displacer. A thickness of the resin is thinner on the high-temperature side than on the low-temperature side.

Objects and advantages of the embodiments will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

In the above-mentioned GM cryogenic refrigerator, both ends of the displacer housed in the cylinder have a temperature difference between a high-temperature side to which a refrigerant gas is introduced from a compressor and a low-temperature side that generates cooling by expansion. For example, in a second stage side of a two-stage GM refrigerator, the low-temperature side becomes 10 K while the high-temperature side becomes 80 K.

In particular, if the GM cryogenic refrigerator is used for a cryopump, when a reverse rotation temperature increase in which a motor for driving a displacer rotates in a reverse direction to a rotation direction in cooling is performed for regeneration, the temperature difference between the high-temperature side and the low-temperature side further increases. More specifically, the high-temperature side of the displacer rises up to a temperature that is about 20 degrees higher than room temperature.

Hence, in the displacer coated with the resin, there is a concern that the displacer may contact the cylinder by causing the resin to expand on the high temperature side. In addition, to prevent this, it is conceived that a film thickness of the resin is made thinner. However, if the film thickness of the resin decreases, the resin is likely to be peeled off from the displacer, and reliability of the cryogenic refrigerator decreases.

Embodiments of the present invention provide a novel and useful cryogenic refrigerator, cryopump and displacer solving one or more of the problems discussed above.

More specifically, embodiments of the present invention provide a cryogenic refrigerator, cryopump and displacer that can maintain high reliability regardless of temperature change.

A description is given below, with reference to drawings of embodiments of the present invention.

Figure 1:
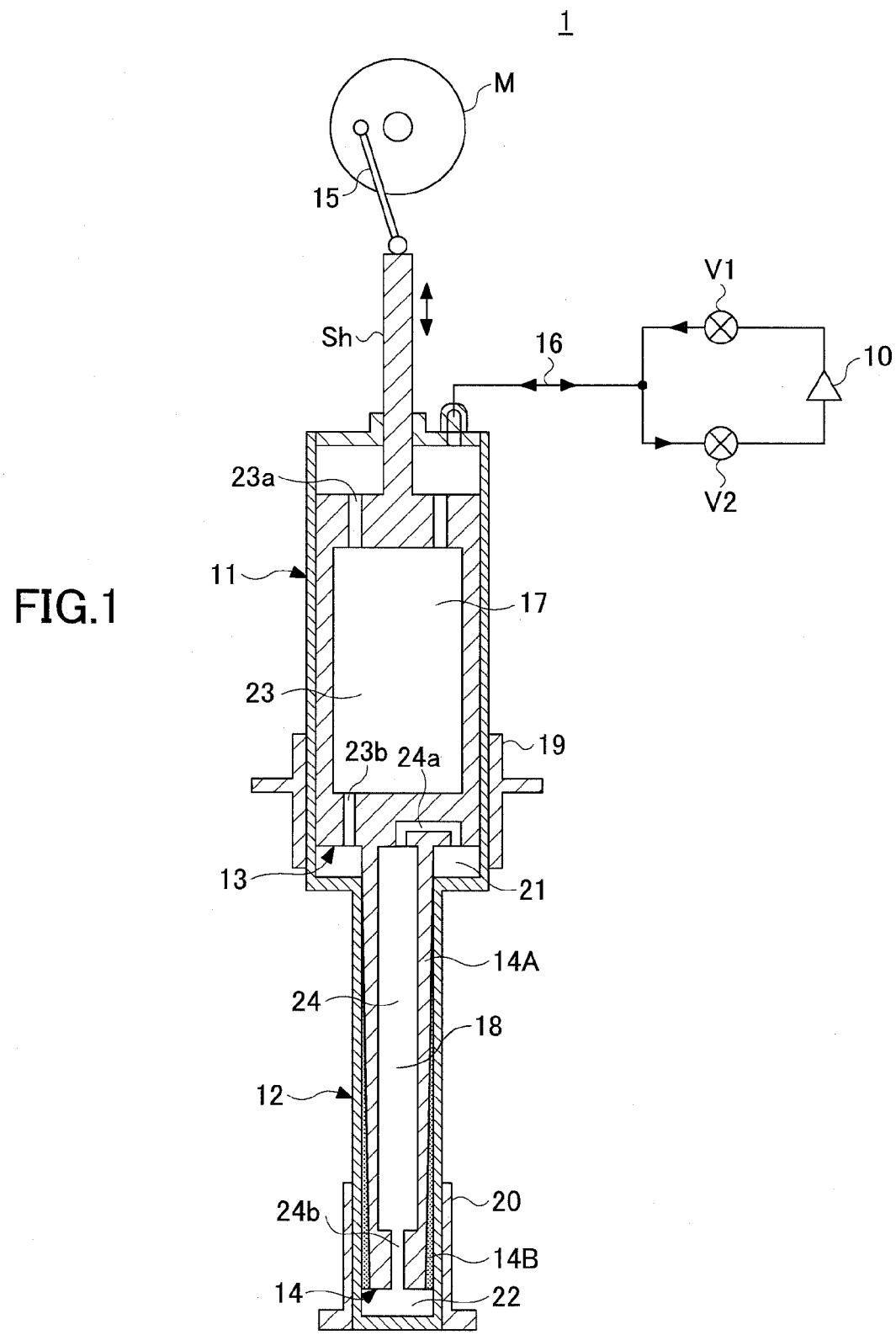
FIG. 1 is a configuration diagram of a cryogenic refrigerator (GM refrigerator) of an embodiment of the present invention.
Figure 2:
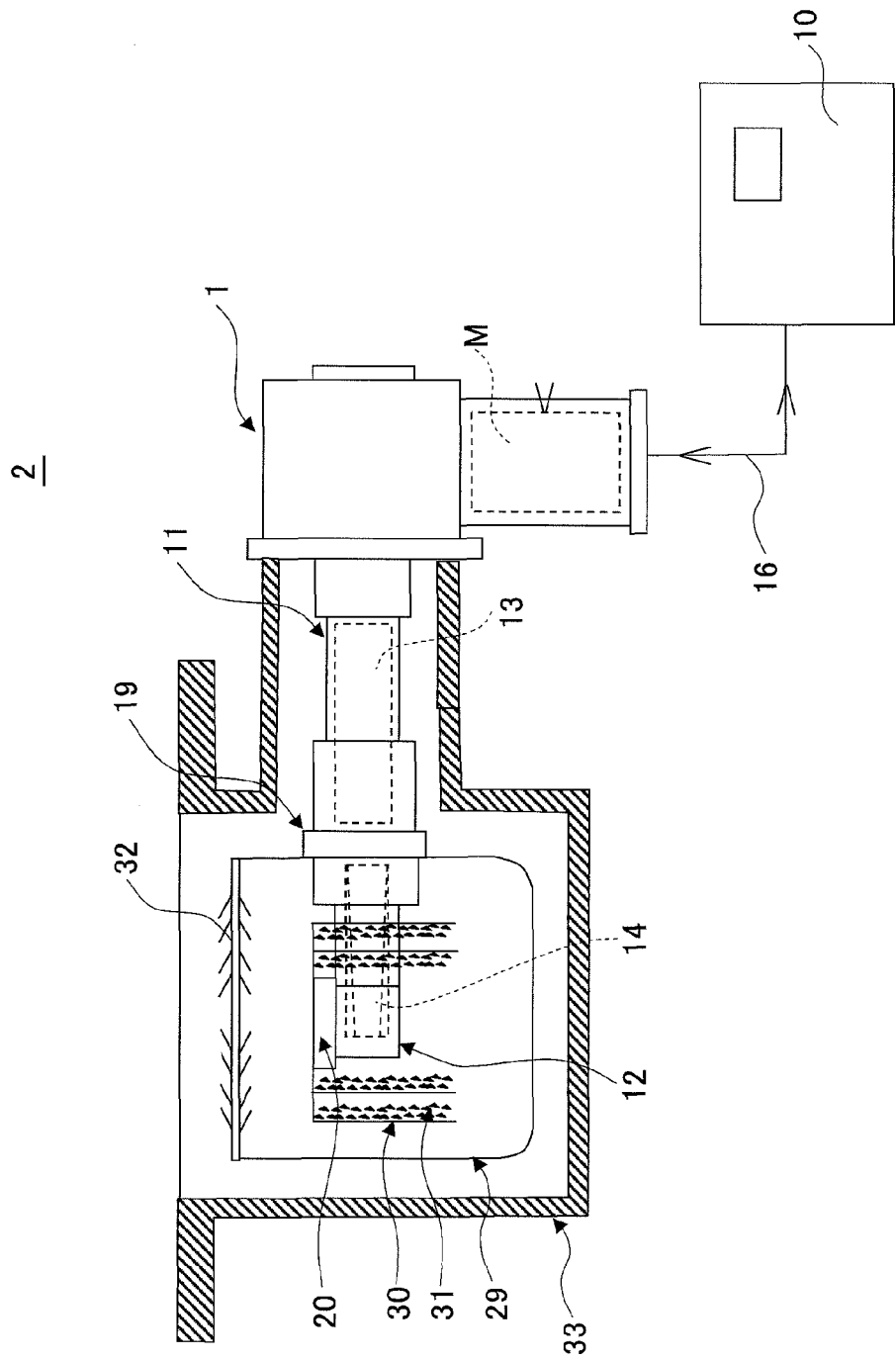
FIG. 2 is a configuration diagram of a cryopump of an embodiment of the present invention.

FIG. 1 shows a cryogenic refrigerator 1 of an embodiment of the present invention, and FIG. 2 shows a cryopump 2 using the cryogenic refrigerator 1 of an embodiment of the present invention. In these embodiments, a description is given about a Gifford-McMahon two-stage refrigerator as a cryogenic refrigerator 1 (which is hereinafter called a "GM refrigerator 1").

The GM refrigerator 1 includes a compressor 10, a first-stage cylinder 11, a second-stage cylinder 12, a first-stage displacer 13, a second-stage displacer 14, a crank mechanism 15, a refrigerant gas passage 16, regeneration materials 17, 18, a first-stage cooling stage 19, a second-stage cooling stage 20, a first-stage expansion chamber 21, a second-stage expansion chamber 22 and the like.

The compressor 10 compresses a helium gas of a refrigerant gas, and generates a high-pressure helium gas. The generated high-pressure refrigerant gas is supplied into the first-stage cylinder 11 through an inlet valve V1 and a refrigerant gas passage 16. Moreover, a low-pressure refrigerant gas exhausted from the first-stage cylinder 11 is recovered to the compressor 10 through the refrigerant gas passage 16 and the exhaust valve V2.

The second-stage cylinder 12 is connected to a bottom part of the first-stage cylinder 11. The first-stage displacer 13 and the second-stage displacer 14 are respectively contained in the first-stage cylinder 11 and the second-stage cylinder 12.

A drive shaft Sh extends upward from the first-stage cylinder 11, and joins with the crank mechanism 15 connected to a drive motor M. The crank mechanism 15 is a mechanism that converts a rotation of the drive motor M to a linear back and forth movement of the displacer 13, 14, and for example, a Scotch-yoke mechanism can be used. Moreover, to perform a regeneration process described below, a motor rotatable forward and backward is adopted for the drive motor M.

The first-stage displacer 13 is housed in the first-stage cylinder 11 movably back and forth. The first-stage expansion chamber 21 is formed in the lower end of the first-stage cylinder 11 and the first-stage displacer 13.

Furthermore, a hollow space (i.e., refrigerant gas passage) 23 to exhaust and supply the refrigerant gas into the first-stage expansion chamber 21 is formed in the first-stage displacer 13. In the hollow space 23, the regeneration material 17 is housed in the hollow space 23. The regeneration material 17 is cooled by contacting the exhausted refrigerant gas (cooling is stored) in exhausting the refrigerant gas from the first-stage expansion chamber 21.

The second-stage displacer 14 is housed in the second-stage cylinder 12 movably back and forth. The second-stage expansion chamber 22 is formed in the lower end of this second-stage cylinder 12 and the second-stage displacer 14.

In addition, a hollow space (i.e., a refrigerant gas passage) 24 to supply and exhaust the refrigerant gas to the second-stage expansion chamber 22 is formed inside the second-stage displacer 14. The regeneration material 18 is cooled by contacting the exhausted refrigerant gas (cooling is stored) in exhausting the refrigerant gas from the second-stage expansion chamber 22.

This second-stage displacer 14 is constituted of a displacer cylinder 14A, and a resin film 14B provided on the outer circumferential surface of this displacer 14. For convenience of explanation, a detailed description is given below about the displacer cylinder 14A and the resin film 14B.

The first-stage cooling stage 19 is provided to surround the first-stage expansion chamber 21 located at the lower end (i.e., the low-temperature end) of the first-stage cylinder 11. Moreover, the second-stage cooling stage 20 is provided to surround the second-stage expansion chamber 22 located at the lower end (i.e., the low-temperature end) of the second-stage cylinder 12.

Drives of the inlet valve V1 and the exhaust valve V2 are controlled by a rotary valve not shown in the drawing driven by the motor M. The rotary valve drives and controls the inlet valve V1 and the exhaust valve V2 so that opening and closing of the inlet valve V1 and the second valve V2 and a back and forth movement of the respective displacers 13, 14 have a predetermined phase difference. This phase difference causes the refrigerant gas to expand in the first-stage expansion chamber 21 and the second-stage expansion chamber 22 so as to generate cooling.

Next, a description is given about operation of the GM refrigerator configured as the above.

The rotary valve opens the inlet valve V1 in the vicinity of the bottom dead center of the respective displacers 13, 14 (i.e., at a position where volumes of the respective expansion chamber 21, 22 are minimized). At this time, the exhaust valve V2 is kept closed.

This causes the high-pressure refrigerant gas compressed by the compressor 10 to be supplied into the first-stage cylinder 11 through the refrigerant gas passage 16. Then, the high-pressure refrigerant gas passes though the hollow space 23 housing the regeneration material 17 and the refrigerant gas passage 23b formed in the lower part of the first-stage displacer 13, and is supplied into the first-stage expansion chamber 21.

The high-pressure helium gas supplied to the first-stage expansion chamber 21 further passes through the refrigerant gas passage 24a formed on the upper part of the second-stage displacer 14, the hollow space 24 housing the regeneration material 18 and the refrigerant gas passage 24b formed in the lower part of the second-stage displacer 14, and is supplied to the second-stage expansion chamber 22.

During this time, the respective displacers 13, 14 move upward by the crank mechanism 15. Then, when the displacers 13, 14 move to a predetermined position in the vicinity of the top dead center, the rotary valve closes the inlet valve V1 so as to stop supplying the refrigerant gas and opens the exhaust valve V2. This allows the high-pressure refrigerant gas in the first and second-stage expansion chambers 21, 22 to expand momentarily, and cooling is generated in the respective expansion chambers 21, 22.

The respective displacers 13, 14 start to move downward after passing the top dead center. Following this, the refrigerant gas expanded in the second-stage expansion chamber 22 is flowed into the hollow space 24 through the refrigerant gas passage 24b. The refrigerant gas flowed into the hollow space 24 cools and flows through the regeneration material 18, and flows into the first-stage expansion chamber 21 through the refrigerant gas passage 24a.

Also, the refrigerant gas flowed into the first-stage expansion chamber 21 flows into the hollow space 23 with the refrigerant gas expanded in the first-stage expansion chamber 21 through the refrigerant gas passage 23b. The refrigerant gas flowed into the hollow space 23 cools and flows through the regeneration material 17, and is recovered into the gas compressor 10 through the refrigerant gas passages 23a, 16 and the exhaust valve V2. Then, the exhaust valve V2 is closed when the displacers 13, 14 reach a predetermined position in the vicinity of the bottom dead center, and the recovery (suction) process of the refrigerant gas is stopped.

By repeating the above cycle, the GM refrigerator 1 of the present embodiment can generate cooling of about 80 to 100 K in the first-stage expansion chamber 21, and cryogenic cooling of about 10 to 30 K in the second-stage expansion chamber 22.

Figure 3:
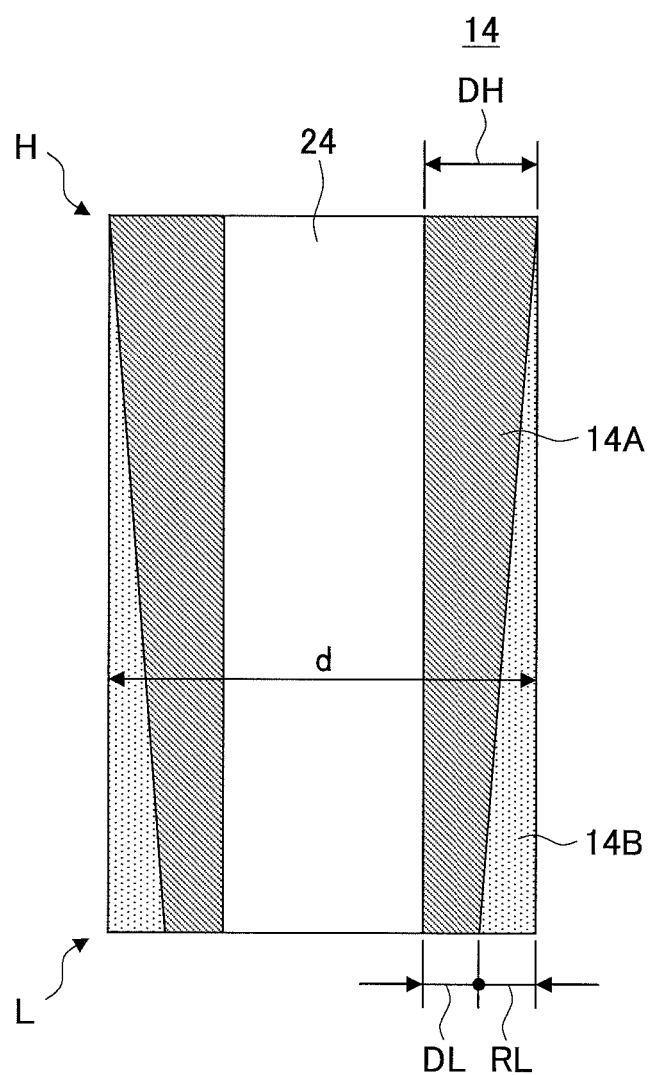
FIG. 3 is a cross-sectional diagram of a displacer of an embodiment of the present invention.

With reference to FIGS. 1 and 3, a description is given about a detailed configuration of the second-stage displacer 14 of an embodiment of the present invention.

Here, FIG. 3 is a diagram showing a basic configuration of the second-stage displacer 14 of the second embodiment, and the length is shown shorter than the actual second-stage displacer 14 for convenience of depiction and explanation. Also, the hollow space 24 is shown as a through hole.

The second-stage displacer 14 of the present embodiment is constituted of the displacer cylinder 14A and the resin film 14B. In the respective drawing, the upper side is the high-temperature side H, and the lower side is the low-temperature side L.

The displacer cylinder 14A is made of a stainless steel. Furthermore, the resin film 14B is made of a fluorine resin and the like. The resin film 14B is provided on (coating) the outer circumferential surface of the displacer cylinder 14A to improve a sealing characteristic between the second-stage cylinder 12 and the second-stage displacer 14.

In the present embodiment, the resin film 14B is formed from the low-temperature side L to the high-temperature side H of the second-stage displacer 14 across the whole area. In addition, the resin film 14B is configured to have a thickness on the high-temperature side (which is hereinafter called a "high-temperature side resin film thickness RH") thinner than that on the low-temperature side (which is hereinafter called a "low-temperature side resin film thickness RL") (RH<RL). In particular, in the resin film 14B of the present embodiment, a thickness of the resin film 14B continuously decreases from the low-temperature side L toward the high-temperature side H, and becomes about zero at the high-temperature side (i.e., upper end) (RH≈0).

Moreover, the displacer cylinder 14A is configured to have a thickness on the high-temperature side (which is hereinafter called a "high-temperature side resin film thickness DH") thicker than that on the low-temperature side (which is hereinafter called a "low-temperature side resin film thickness DL") (DL<DH). Furthermore, a total diameter d of the second-stage displacer 14 obtained by adding the resin film 14B to the displacer cylinder 14A has the same diameter from the low-temperature side L to the high-temperature side H.

Next, referring to FIG. 2, a description is given about a cryopump using the GM refrigerator 1 including the second-stage displacer 14 configured as the above.

The cryopump 2 is mounted on a process chamber not shown in the drawing (e.g., a process chamber of a semiconductor fabrication apparatus), and evacuates the process chamber to make vacuum in the process chamber. This cryopump 2 includes the GM refrigerator 1, a shield 29, a cryopanel 30, a louver 32, a vacuum chamber 33 and the like.

The respective cylinders 11, 12, the shield 29, the cryopanel 30 and the like are provided inside the vacuum chamber 33. The vacuum chamber 33 is supposed to be mounted on the above-mentioned process chamber. Furthermore, in the cryopump 2 of the present embodiment, the GM refrigerator 1 is installed transversally relative to the vacuum chamber 33.

In addition, the motor M of the GM refrigerator 1 is rotatable in forward and backward directions. The motor M is connected to a controller not shown in the drawing, and is configured to rotate forward in a vacuum process and to rotate backward in regeneration following instructions from the controller.

Moreover, the shield 29 is connected to the first-stage cooling stage 19 provided on the outer circumferential surface of the first-stage cooling stage 19. The shield 29 functions to prevent outer radiant heat from being conducted to the cryopanel 30.

The shield 29 includes the louver 32. The louver 32 is provided to cover the top of the shield 29 formed into a cup shape (including a bottom). The louver 32 is provided close to an upper opening of the vacuum chamber 33.

The cryopanel 30 is connected to the second-stage cooling stage 20 provided on the outer circumferential surface of the second-stage cylinder 12 of the GM refrigerator 1. The cryopanel 30 includes an activated carbon 31 on the inner circumferential surface thereof.

When the cryopump 2 configured as the above performs a vacuum process, the motor M of the GM refrigerator is rotated in a forward direction. By causing the motor M to rotate forward, the GM refrigerator 1 enters a cooling mode, and a refrigerant gas supplied from the compressor 10 to the first-stage expansion chamber 21 and the second-stage expansion chamber 22 (see FIG. 1) expands following the movement of the respective displacers, and generates cooling.

This allows the first-stage cooling stage 19 to be cooled up to, for example, 80 to 100 K (100 K or less in the shield 29), and the second-stage cooling stage 20 to be cooled up to, for example, 5 to 20 K (20 K or less in the cryopanel 30).

When various kinds of gases in the process chamber go into the cryopump in this state, carbon dioxide is mainly condensed by the louver 32 and the shield 29; argon or nitrogen is mainly condensed by the cryopanel 30; and further hydrogen, neon, helium and the like are mainly adsorbed by the activated carbon. By doing this, the process chamber is evacuated and high vacuum can be obtained. Here in the following description, an introduction gas condensed by or adsorbed on the shield 29, the cryopanel 30 and the like is called a "solid state gas".

In the meantime, the introduction gas evacuated from the process chamber as mentioned above is condensed by or adsorbed on the shield 29, the cryopanel 30, the activated carbon 31 and the like. When an amount of the solid state gas 21 condensed by the shield 29, the cryopanel 30 and the like is increased, an evacuation performance of the cryopump is decreased. Accordingly, a regeneration process that evacuates the solid state gas condensed by the cryopump 30 from the vacuum chamber 33 is required.

Here, a description about a regeneration method in the cryopump 2 is given below.

The regeneration is performed by increasing a temperature of the cryopump 2 to evaporate the condensed and adsorbed solid state gas, and by releasing the evaporated gas. There are various kinds of regeneration methods, one of which is to increase a temperature of the GM refrigerator 1 by rotating the motor M in a direction opposite to a rotation direction (forward rotation direction) during the cooling process (the temperature increase by this method is called a "reverse rotation temperature increase").

In this reverse rotation temperature increase, by causing the motor M for driving the displacers 13, 14 to rotate in the direction reverse to the rotation direction during the cooling process, a cooling cycle of the GM refrigerator 1 is reversed, by which temperatures of the respective cooling stages 19, 20 are increased. By allowing the temperatures of the respective cooling stages 19, 20 to be increased, the temperatures of the shield 29 and the cryopanel 30 connected to the cooling stages 19, 20 are increased, so that the solid state gas condensed by or adsorbed on the shield 29, the cryopanel 30 and the like can be evaporated.

In the meanwhile, when the reverse rotation temperature increase process is performed by reversely rotating the motor M, the temperatures of the first-stage cylinder 11 and the displacer 13 are increased up to a degree of room temperature.

The high-temperature side H of the second-stage displacer 14 is connected to the first-stage displacer 13. Because of this, during the reverse rotation temperature increase, the temperature of the high-temperature side H of the second-stage displacer 14 is also increased up to the degree of room temperature.

A linear expansion coefficient of the fluorine resin constituting the resin film 14B, $5*10^{-5}/°$ C. to $12*10^{-5}/°$ C., is larger than a linear expansion coefficient of the stainless steel constituting the displacer cylinder 14A, $10.4*10^{-6}/°$ C. to $17.3*10^{-6}/°$ C.

Accordingly, as discussed above, the second-stage displacer coated with the resin film in a uniform thickness on the displacer cylinder as the conventional has a concern that peeling and the like of the resin film may occur especially on the high-temperature side H.

In contrast, in the second-stage displacer 14 of the present embodiment, as described by using FIG. 3, with respect to the thickness of the resin film 14B provided (coating) on the outer circumferential surface of the displacer cylinder 14A, the high-temperature side resin thickness RH is set to be thinner than the low-temperature side resin thickness RL (RH<RL). Due to this, the high-temperature side H of the second-stage displacer 14 increasing its temperature up to a temperature about 20 degrees higher than room temperature is configured to mainly include the displacer cylinder 14A that has an expansion amount smaller than the resin film 14B. Therefore, thermal expansion of the second-stage displacer 14 can be prevented on the high-temperature side H.

On the other hand, the low-temperature side L of the second-stage displacer 14 is configured to mainly include the resin film 14B. During the reverse rotation temperature increase, the temperature of the low-temperature side L does not increase up to room temperature, and a low temperature is maintained relative to the high-temperature side H. Accordingly, the resin film 14B does not expand enough to contact the second-stage cylinder 12 on the low-temperature side L.

Furthermore, making the low-temperature side resin film thickness RL of the second-stage displacer 14 larger can prevent the resin film 143 from being peeled from the displacer cylinder 14A on the low-temperature side L.

Therefore, according to the GM refrigerator 1, the cryopump 2, and the second-stage displacer 14 of the present embodiment, contact between the second-stage cylinder 12 and the second-stage displacer 14 can be prevented, and occurrence of motor slip of the motor M can be prevented. In addition, since the resin film 14B does not peel from the displacer cylinder 14A, reliability of the GM refrigerator 1, the cryopump 2, and the second-stage displacer 14 can be improved.

Next, a description is given about modifications of the above displacer cylinder 14A.

Figure 4:
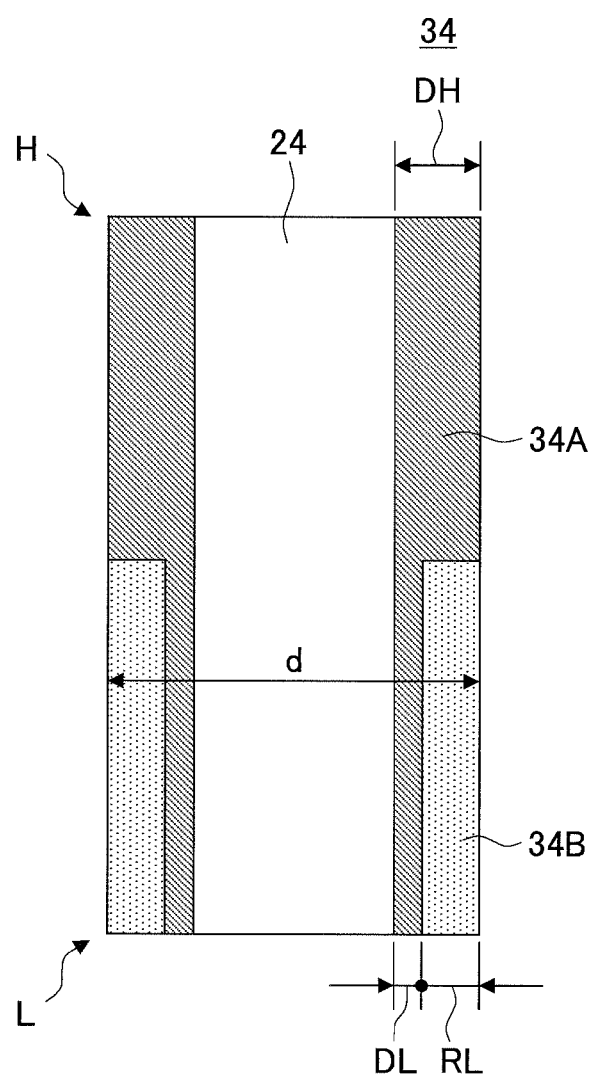
FIG. 4 is a cross-sectional diagram of a displacer of a first modification of the embodiment.
Figure 5:
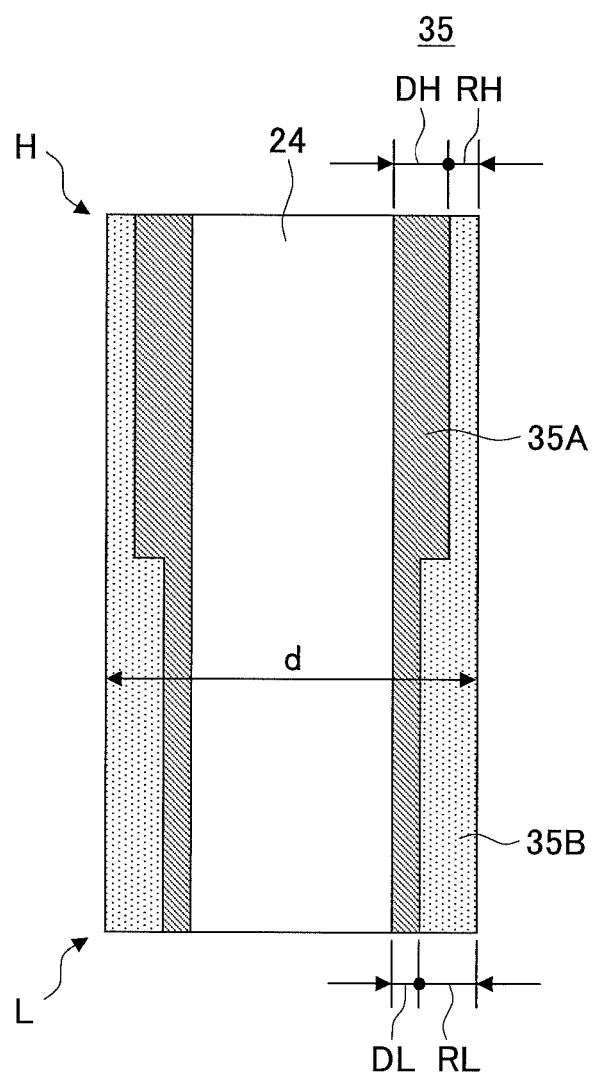
FIG. 5 is a cross-sectional diagram of a displacer of a second modification of the embodiment.
Figure 6:
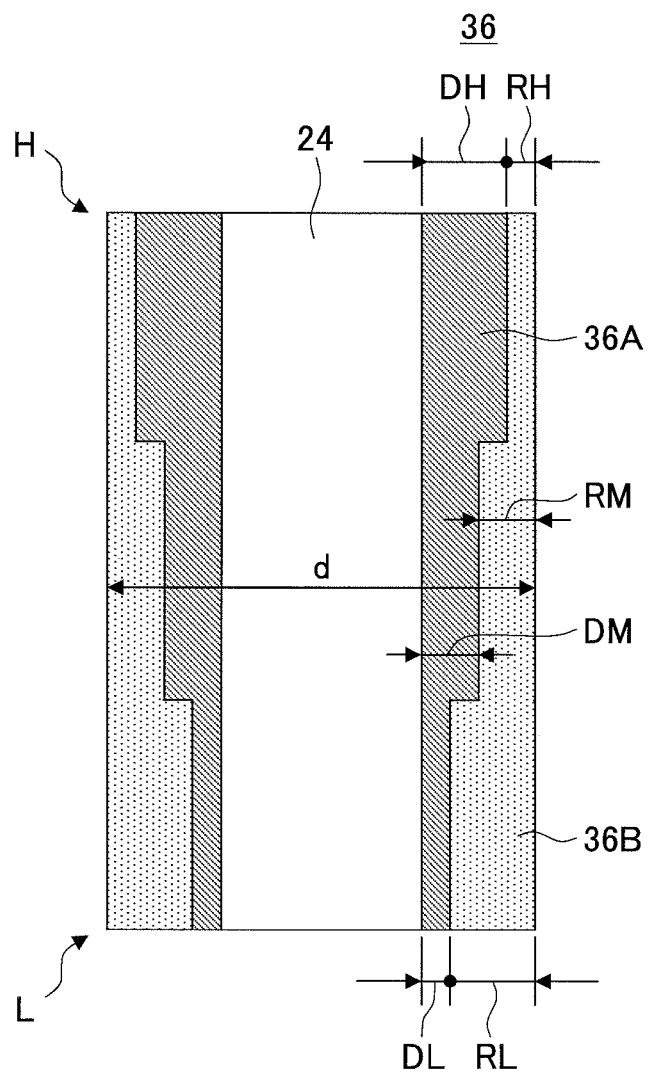
FIG. 6 is a cross-sectional diagram of a displacer of a third modification of the embodiment.

FIGS. 4 through 6 show first through third modifications of the displacer 14A. In FIGS. 4 through 6, the same numerals are put to configurations corresponding to those shown in FIGS. 1 through 3, and the description is omitted.

FIG. 4 shows a second-stage displacer 34 to be a first modification. In the second-stage displacer 14 of the present embodiment, the resin film 14B is configured to become continuously thinner from the low-temperature side L toward the high-temperature side H in thickness.

In contrast, a vacuum chamber 24 of the first modification features to include a resin film 34B having the same thickness from the low-temperature side L across a predetermined range. In this configuration, the low-temperature side resin film thickness RL of the resin film 34B exists on the low-temperature side L, and the resin film 34B does not exist on the high-temperature side H. In response to this, with respect to the thickness of the displacer cylinder 34A, the thickness of the low-temperature side DL is thinner than that of the high-temperature side DH (DL<DH). In this configuration, an effect similar to the displacer cylinder 14A shown in FIGS. 1 through 3 can be implemented.

FIGS. 5 and 6 show second-stage displacers 35, 36 to be the second and third modifications. The respective displacers 35, 36 feature to be configured to include resin films 35B, 36B whose thicknesses decrease in stages from the low-temperature side L toward the high-temperature side H.

In the second-stage displacer 35 of the second modification shown in FIG. 5, the thickness of the resin film 35B changes in two stages. Moreover, a formation position of the step is set at approximately the center position of the second-stage displacer 35.

More specifically, the thickness of the resin film 35B is RL on the low-temperature side L, and is RH thinner than RL on the high-temperature side (RH<RL). In response to this, with respect to the thickness of the displacer cylinder 35A, the low-temperature side thickness DL is thinner than that of the high-temperature side DH (DL<DH).

In the second-stage displacer 36 of the third modification shown in FIG. 6, the thickness of the resin film 36B changes in stages. Furthermore, formation positions of the respective steps are set at about equal distance.

More specifically, if the thickness of the resin film 36B on the low-temperature side is made RL; the thickness of the center part is made RM; and the thickness of the high-temperature side is made RH, these are set to meet RH<RM<RL. In response to this, the thickness of the displacer 36A is set to meet DL<DM<DH.

The displacers 35, 36 of the second and third modifications are configured so that the thicknesses of the resin film 35B, 36B decreases in stages from the low-temperature side L toward the high-temperature side H, by which a wedge effect is generated at the respective step parts between the displacer cylinders 35A, 36A and the resin films 35B, 36B, adding to the effects of the above stated embodiment and the first modification. This allows the peeling of the resin films 35B, 36B to be more certainly prevented.

In this manner, according to embodiments of the present invention, because a thickness of a resin is thin on the high-temperature side, an increase of the thickness of the resin is reduced even if a temperature of the high-temperature side is increased, which can prevent a displacer from contacting a cylinder. Moreover, because the resin is thick on the low-temperature side, peeling of the resin from the displacer can be prevented.

In the present specification, expressions of "a thickness of resin is made thinner on the high-temperature side than on the low-temperature side" and "a thickness of resin is made thinner in stages from the low-temperature side toward the high-temperature side" include configurations where the resin films 14B, 34B do not exist on the low-temperature side L such as the embodiments shown in FIGS. 1 and 3, and the first modification shown in FIG. 4.

All examples recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

More specifically, the second-stage displacer in the respective embodiments 14, 34, 35 and 36 are configured to provide only the resin films 14B, 34B, 35B and 36B in the displacer cylinders 14A, 34A, 35A and 36A. However, by forming grooves (annular grooves or spiral grooves) to introduce the refrigerant gas in the resin films 14B, 34B, 35B and 36B, making a configuration capable of further enhancing the cooling efficiency is possible.

In addition, though the configuration where the resin films are provided in the displacer is shown in the present embodiments, the formation position of the resin films is not limited in the displacer, but may be formed inside the second-stage cylinder 12.

Moreover, though the configuration where the outer diameter d of the displacer is uniform is shown in the present embodiment, not limited to this, the diameter on the high-temperature side may be configured to be smaller than that on the low-temperature side. For example, the outer diameter (thickness) of the displacer cylinder on the low-temperature side may be formed to be approximately the same as that on the high-temperature side, and only the thickness of the resin film on the high-temperature side may be thinner than that on the low-temperature side.

Furthermore, in the above modifications, though the configurations where the thickness of the resin films are changed into two steps or three steps are shown, the steps formed in the resin films are not limited to the two steps or three steps, but setting more steps is possible.

What is claimed is:

1. A two-stage GM cryogenic refrigerator comprising:
   a displacer cylinder extending from a low-temperature end to a high-temperature end;
   a displacer including the displacer cylinder and a resin;
   a motor configured to drive the displacer, the motor being configured to be rotatable forward in cooling and backward in increasing a temperature; and
   the resin provided on an outer circumferential surface of the displacer cylinder to entirely cover the displacer cylinder from the low-temperature end to the high-temperature end, a thickness of the resin being thinner on the high-temperature end than on the low-temperature end, a total diameter of the displacer obtained by adding the resin to the displacer cylinder having a same diameter from the low-temperature end to the high-temperature end.

2. The cryogenic refrigerator as claimed in claim 1, wherein the thickness of the resin is decreased continuously from the low-temperature end toward the high-temperature end.

3. The cryogenic refrigerator as claimed in claim 1, wherein the thickness of the resin is decreased in stages from the low-temperature end toward the high-temperature end.

4. A cryopump comprising:
   a vacuum chamber configured to allow a purge gas to be supplied thereinto and to be evacuated therefrom;
   a cryopanel provided in the vacuum chamber; and
   a cryogenic refrigerator configured to cool the cryopanel, the cryogenic refrigerator including;
   a displacer cylinder extending from a low-temperature end to a high-temperature end;
   a displacer including the displacer cylinder and a resin;
   a motor configured to drive the displacer, the motor being configured to be rotatable forward in cooling and backward in increasing a temperature; and
   the resin provided on an outer circumferential surface of the displacer cylinder to entirely cover the displacer cylinder from the low-temperature end to the high-temperature end, a thickness of the resin being thinner on the high-temperature end than on the low-temperature end, a total diameter of the displacer obtained by adding the resin to the displacer cylinder having a same diameter from the low-temperature end to the high-temperature end.

5. The cryopump as claimed in claim 4, wherein the thickness of the resin is decreased continuously from the low-temperature end toward the high-temperature end.

6. The cryopump as claimed in claim 4, wherein the thickness of the resin is decreased in stages from the low-temperature end toward the high-temperature end.

7. A displacer provided in a cryogenic refrigerator, the displacer comprising: a displacer cylinder extending from a lower-temperature end to a high-temperature end; and
   a resin provided on an outer circumferential surface of the displacer cylinder to entirely cover the displacer cylinder from the low-temperature end to the high-temperature end, a thickness of the resin being thinner on the high-temperature end than on the low-temperature end, a total diameter of the displacer obtained by adding the resin to the displacer cylinder having a same diameter from the low-temperature end to the high-temperature end.

8. The displacer as claimed in claim 7, wherein the thickness of the resin is decreased continuously from the low-temperature end toward the high-temperature end.

9. The displacer as claimed in claim 7, wherein the thickness of the resin is decreased in stages from the low-temperature end toward the high-temperature end.

* * * * *